INVENTOR.
William C. Conklin
BY Nicholas Lang
ATTORNEY

Patented Aug. 26, 1952

2,608,595

UNITED STATES PATENT OFFICE 2,608,595

FORCE FITTED CASE FOR SINGLE CELLS

William C. Conklin, St. Paul, Minn., assignor to P. R. Mallory & Co., Inc., Indianapolis, Ind., a corporation of Delaware Application January 17, 1950, Serial No. 139,059

4 Claims. (Cl. 136—107)

This invention relates generally to primary electric cells and has specific reference to the assembly of such cells including the casings therefor.

It is an object of the present invention to provide an improved casing construction for single cell batteries.

Another object of the present invention is to provide an improved and inexpensive casing for primary cells.

Still another object of the present invention is to provide, in the assembly of primary cells, a casing which will eliminate a washer spacer formerly found in the usual cell.

Another object of the invention is to provide uninhibited venting for a primary cell.

Other objects of the invention and the nature thereof will become apparent from the following description considered in connection with the accompanying figures of the drawing and wherein like reference characters describe elements of similar function therein and wherein the scope of the invention is determined rather from the dependent claims.

Figure 1:
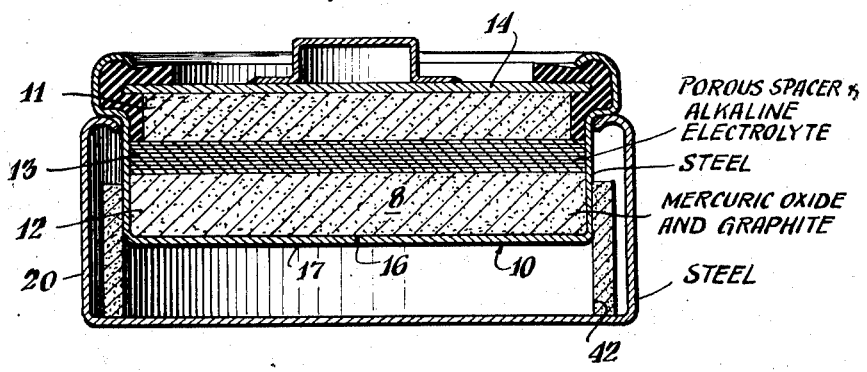
Figure 1 is an axial cross sectional view through a primary cell embodying the features of the invention.

Generally speaking, the invention has application to primary cells containing an electrolyte cooperating with an anode and a cathode electrode which may be formed integral with the primary cell container structure to provide the necessary electrical connections. In such cells, a vent is provided for the escapement of any gases which may be engendered during the operation of the cell. Concomitant with the escape of the gases there may also be some liquid electrolyte which may tend to escape through such a vent and which should be prevented from externally seeping outside the cell.

By the present invention there is provided a novel casing assembly for single cell batteries which allows for proper venting and confines escaping liquid electrolyte. In contradistinction to the present invention the ordinary casing heretofore used employed a washer type spacer in the base of an associated casing to keep the primary cell from abutting the bottom of the primary cell. This type of assembly in many instances prohibited the proper operation of the vent and as a result accumulated gases were prevented from escaping and improper efficiency of the cell then resulted. In such a cell the top edge of the casing was crimped over a flange of the cell and was spot welded to at least one point thereon so as to assure substantial electrical contact between the primary cell and the outside casing. In the present invention the necessity for utilizing a washer spacer so as to prevent abutting of the primary cell against the bottom of the casing is eliminated. In addition, the assembly operations of crimping and spot welding formerly required are also eliminated.

Referring now to the figures of the drawing there is shown a primary cell 8 including an electrolyte herein shown as being an aqueous alkaline solution, such as a solution of potassium hydroxide. As shown, electrodes 11 and 12 are separated by a porous spacer 13 which is usually impregnated with the electrolyte. Electrode 11 may be a body of amalgamated zinc and electrode 12 may be a depolarizer body of mercuric oxide mixed with graphite. Container 10 of the cell may be formed of steel and the top 14 thereof of amalgamated zinc or of magnesium. In the operation of the cell the mercuric oxide of the electrode 12 becomes reduced to liquid mercury. Container 10 is provided with an emergency vent 16 which may comprise a closed crack or slit in the lower wall 17 of the container. This slit 16 may be formed by punching a wall 17 with a chisel-like tool and then stamping the metal together again to close the slit 16. The vent in slit 16 may be then sealed with lacquer layer.

Figure 2:
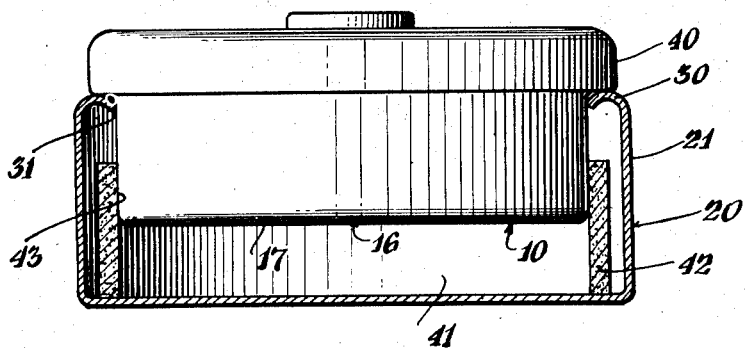
Figure 2 is a vertical cross sectional view of the embodiment shown in Figure 1, useful in showing the assembly construction thereof.
Figure 3:
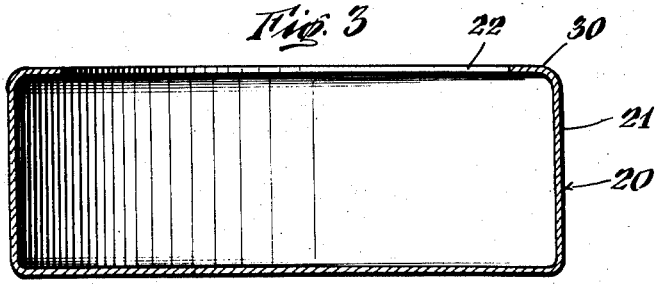
Figure 3 is a vertical cross sectional view of the casing only used with an associated primary cell.

Slit 16 functions as an emergency vent should gas pressure develop within the cell during shelf life or use due to impurities in the materials used, improper storage conditions, or other causes. If gas develops the pressure will bulge the bottom wall 17 slightly and open slit 16 sufficiently to permit escape of liquid or gas from the container. Slit 16 also serves as an end-of-life vent to relieve the pressure due to any gas which may be generated at the end of cell life after all the mercuric oxide depolarizer has been reduced to liquid mercury. As shown casing 20 comprises a shell 21 having a central opening 22. As seen in Figure 2, top edge 30 of casing 20 is rolled in so as to contact cell container 10 at a point thereof 31. Cell 8 is of greater diameter than opening 22 of casing 20 so that by insertion the opening 22 is stretched and a tight fit is obtained between cell 8 and top edge 30 of casing 20. Primary cell 8 rests on the rolled top edge 30 of the casing 20 through provision of a flange 40 on cell 8. Thus, a substantial space 41 is provided between the bottom of cell 8 and casing 20 whereby if gas venting occurs then adequate room is provided for the escape of gases. At the bottom of cell 8 an absorbent ring 42, vertically extending from the bottom of the casing 20, makes circumferential contact with casing 10 as at 43 and acts in the dual capacity of absorbing any dielectric which may be present through the occurrence of venting and also acts as a retaining or abutting wall for the support of cell 8 within casing 20. In the assembly the primary battery cell 8 is pushed into casing 20. Since the diameter of hole 22 in the casing is smaller than that of the cell 8, as stated above, the cell stretches and turns inwardly to form lip or edge 30 therefor so as to grip the external circumference of the casing in a substantially tight manner. Cell 8 is inserted within casing 20 until flange 50 makes contact with top edge 30 of the casing. In this manner the necessity for spot welding casing 20 to its associated cell structure 10, as formerly required, is eliminated. Since, when the cell is pushed into the casing, the flange of the cell comes into contact with the top of the casing to provide intimate contact therebetween, the cell is automatically kept from abutting the bottom wall of the casing and this eliminates the necessity for a spacer washer, as herebefore required. There is then obtained a great improvement in the assembly of primary cells which obviates the need for critically welding a casing to an associated primary cell structure and, in addition, eliminates the need for and the cost of an additional spacer washer.

The invention of a new casing construction for a primary cell as hereinabove described is merely illustrative and not exhaustive in scope and since many widely different embodiments of the invention may be made without departing from the scope thereof, it is intended that all matter contained in the above description and shown in the accompanying drawing shall be interpreted as illustrative and not in a limiting sense.

What is claimed is:

1. In combination with a dry cell comprising a first sealed container, an anode, an electrolyte, an emergency vent in the bottom wall of said container and responsive to excess pressure within the cell, a flange on said container, a second container separate therefrom including a rolled top portion, said rolled top portion situated beneath said flange and making direct contact therewith, and an absorbent cylindrical ring encasing the lower peripheral portion of the first container and abutting the bottom of said second container, the bottoms of said first and second container being spaced apart, whereby said first container is maintained at a definite minimum spacing from the bottom of said second container while making electrical contact therewith.

2. In combination with a dry cell comprising a first sealed container having a side wall acting as an electrode thereof and including venting means in the bottom wall of said container of said cell for releasing excess pressure from said cell, a flange on said cell, a second container separate from said first container including a rolled top edge placed underneath and making direct electrical contact with said flange on said cell, and an absorbent cylindrical ring encasing the lower peripheral portion of said first container and abutting the bottom of said second container, the bottom walls of said containers being definitely spaced from each other with said ring being placed interiorly of said second container, whereby said first container is maintained at a definite minimum spacing from the bottom of said second container to provide proper venting for the cell.

3. In combination with a dry cell comprising a first sealed container having an outer side wall acting as an electrode thereof and having vent means placed at a bottom wall thereof for allowing excessive interior gas pressure to escape from the cell, a flange on said cell, a second container comprising a cup-shaped element having a central opening, said central opening being of a diameter less than the diameter of the bottom wall of said first container of said cell whereby said second container is adapted to be force-fitted on said first container of said cell, an annular lip at the top of said second container, said lip being placed in direct electrical contact underneath said flange of said cell, and an absorbent cylindrical ring vertically set within said second container encasing the lower peripheral portion of said first container and abutting the bottom of said second continer, the bottoms of said first and second container being spaced apart, whereby said first container is maintained at a definite minimum spacing from the bottom of said second container while making electrical contact therewith.

4. A primary cell comprising a sealed container encompassing the components of said battery cell, a flange on said cell, a second container separate from said first container including a top rolled edge, said top rolled edge making underneath electrical contact with said flange on said cell, said second container having a cross-sectional opening of a diameter less than the cross-sectional diameter of said cell whereby said second container is adapted to be force-fitted on said container of said cell, vent means included in the bottom wall of the first container of said cell for releasing excessive pressure from therewithin, and a cylindrical absorbent ring surrounding a portion of the bottom peripheral wall of said first container of said cell and abutting the bottom wall of said second container, whereby said first container of said cell is maintained at a definite minimum spacing from the bottom of said second container while making electrical contact therewith and allowing for the proper operation of the vent means of said cell.

WILLIAM C. CONKLIN.

REFERENCES CITED

The following references are of record in the file of this patent:

UNITED STATES PATENTS

| Number | Name | Date |
|---|---|---|
| 1,766,418 | Weissman | June 24, 1930 |
| 2,482,514 | Ruben | Sept. 20, 1949 |

FOREIGN PATENTS

| Number | Country | Date |
|---|---|---|
| 217,240 | Germany | Dec. 24, 1909 |